United States Patent

Hampp et al.

[11] Patent Number: 5,374,492
[45] Date of Patent: Dec. 20, 1994

[54] PURPLE MEMBRANE PREPARATIONS HAVING INCREASED HOLOGRAPHIC DIFFRACTION EFFICIENCY

[75] Inventors: Norbert Hampp; Andreas Popp, both of Munich; Alfred Miller, Martinsried; Christoph Bräuchle; Dieter Oesterhelt, both of Munich, all of Germany

[73] Assignee: Consortium für elektrochemische Industrie GmbH, Munich, Germany

[21] Appl. No.: 943,772

[22] Filed: Sep. 11, 1992

[30] Foreign Application Priority Data

Sep. 12, 1991 [DE] Germany ............... 4130380

[51] Int. Cl.$^5$ ............................................ G03H 1/02
[52] U.S. Cl. ................................. 270/1; 430/2; 359/3; 435/71.1; 435/71.2
[58] Field of Search ............ 430/1, 2; 359/1, 3; 435/71.1, 71.2

[56] References Cited

U.S. PATENT DOCUMENTS

| | | | |
|---|---|---|---|
| 5,079,149 | 1/1992 | Neumann et al. | 435/71.2 |
| 5,223,355 | 6/1993 | Hampp et al. | 430/1 |
| 5,253,198 | 10/1993 | Birge et al. | 365/106 |

FOREIGN PATENT DOCUMENTS

| | | |
|---|---|---|
| 0406850 | 5/1990 | European Pat. Off. |
| 2251949 | 10/1990 | Japan |
| 3081756 | 4/1991 | Japan |

OTHER PUBLICATIONS

Rayfield, F. W. "Evidence that charge motion . . . " Photodem. and Photobio. 43(2) 1986 pp. 171–174.
Zeffil et al. "Spectral relationship . . . " J. Phys. Chem. 96 1992 7789–7792.
Zhivkou et al. "Photometric determination of . . . " Biophysics 36(6) 1991 1011–1014.
Draheim, J. E. et al. "Dehydration–Induced . . . " Biophys J. 54 1988 pp. 931–944.
CA 104(21):182020c May 1986.
CA 112(16): 148901w 1990.
Abstract of JP 3-81756 (Derwent).
Oesterhelt et al. Methods in Enzymology (31) pp. 667–678 (1974).
Hampp et al J. Biophys. (58) pp. 83–93 (1990).
Hampp et al. Proc. SPIE (1125) pp. 2–8 1989.
Bazhenov et al. in "Optical Processing and Computing" 103–144.
Ovchinnikov et al "Photoelectric & Spectral Responses of Bacteriarhodonsin" Eur. J. Biochem. 127(2) 329–332 1982.
Vsevolodov et al Biophysics (30) pp. 962–967 (1985).
Bechthold et al Appl. Opt. (21) pp. 127–132 (1982).
Hampp et al. "Studies in Organic Chemistry 40, Photochromism" 954–957 (1990).
Gärtner et al. Eur. J. Biochem. (176) pp. 641–648 (1988).
Oesterhelt et al Ann. Microbiol. 134B pp. 137–150 (1983).
Milter et al Biochim and Biophys. Acta 1020 pp. 57–64 (1990).
Kogelnik. J. Bell Syst. tech. 48 pp 2909–2947 (1969).

*Primary Examiner*—Charles L. Bowers, Jr.
*Assistant Examiner*—Martin J. Angebrandt
*Attorney, Agent, or Firm*—Collard & Roe

[57] ABSTRACT

Purple membrane preparations having an increased holographic diffraction efficiency. The purple membrane preparations have a diffraction efficiency of less than 5 seconds and a resolution of greater than 1,500 lines/mm. The purple membrane preparations are obtainable by adjusting a purple membrane suspension having a photocycle time of at least 10 ms to a pH of between 6 and 11 by means of a buffer, adding from 1% to 10% by weight of a proton donor to this purple membrane suspension, and drying the resultant suspension down to a water content of from 1% to 30% by weight.

5 Claims, No Drawings

PURPLE MEMBRANE PREPARATIONS HAVING INCREASED HOLOGRAPHIC DIFFRACTION EFFICIENCY

BACKGROUND OF THE INVENTION

1. Field of the Invention

The present invention relates to purple membrane preparations having increased holographic diffraction efficiency.

2. The Prior Art

The use of bacteriorhodopsin or bacteriorhodopsin variants as the active component in optical recording media is known. Thus, for example, the article by N. Hampp and C. Bräuchle entitled, *Bactedorhodopsin and Its Functional Variants: Potential Applications in Modern Optics*, published in Organic Chemistry 40, Photochromism, 954–975, Ed. H. Dürr, H. Bouas-Laurent, Elsevier 1990, tabulate possible uses of bacteriorhodopsin.

For reasons of greater stability to thermal, chemical and photochemical destruction or degradation, the bacteriorhodopsin and/or its variants as the active component in optical recording media is preferably not employed in the form of the free molecules, but instead in membrane-bound form, i.e., generally in the form of optionally comminuted purple membrane or variants thereof. Variants of purple membrane, i.e., membranes which contain variants of bacteriorhodopsin, can be obtained in a manner known per se with the aid of biotechnological processes, for example, by varying the retinal chromophore by chemical exchange (see, for example, *Methoxyretinals in Bacteriorhodopsin. Absorption Maxima, Cis-Trans Isomerization and Retinal Protein Interaction*, by W. Gärtner, D. Oesterhelt, 1988, Eur. J. Blochem. 176, 641–648) or by modifying the bacterio-opsin molecule (see, for example, D. Oesterheit, G. Krippahl, Ann. Microbiol. (Inst. Pasteur) 134B (1983) 137–150). The characterization of bacteriorhodopsin variants with modified bacterio-opsin is described, for example, in *Kinetic Optimization of Bacteriorhodopsin by Aspartic Acid 96 as an Internal Proton Donor*, by A. Miller and D. Oesterhelt, Blochim. and Biophys. Acta (1990), 1020, 57–64.

A promising application of purple membranes is in holography. Holography is taken to mean purely holographic processes and optical processes which involve one or more holographic part-steps.

The advantages of using purple membrane preparations for said purposes lie, in particular, in the favorable absorption range, the high resolution which can be achieved, the large number of possible write/erase cycles, the long shelf life, the high sensitivity and the light fastness. Use in color holography is also possible. This applies to all hologram types which are possible using purple membrane preparations, for example, the embodiments known as B-type holograms, in which photoconversion of the initial stage (=B) of the active component is carried out, or those hologram types in which an intermediate state or photointermediate is subjected to photoconversion (for example, M-type hologram). It is advantageous for this purpose to select an intermediate whose absorption properties differ significantly from those of the initial state. Such an intermediate which can favorably be employed for holographic purposes is available, for example, in the form of the intermediate state of naturally occurring bacteriorhodopsin, frequently known as the M-state.

For holography, purple membranes can be used, for example, in the forms of suspensions or films.

Purple membrane suspensions contain purple membranes in water, i.e., the water content in purple membrane suspensions is greater than the purple membrane content. Purple membrane suspensions can be used as recording materials for information in which only low spatial resolution of the recording material is required and/or long rise times of the holographic diffraction efficiency are sufficient.

Holographic diffraction efficiency is taken to mean the ratio between the intensity of light diffracted at the holographic grating and the intensity of the light incident on the holographic grating. The holographic diffraction efficiency is generally given in percentage. The maximum value which the diffraction efficiency can reach is 100%. The holographic diffraction efficiencies given for the purple membrane preparations according to the invention relate, as is also usual for the data in the prior art, to a wavelength of 632.8 nm. The rise in the holographic diffraction efficiency is the time from commencement of exposure until the maximum diffraction efficiency has been reached. The shorter this time, the more the material is suitable for dynamic applications. The minimum of the theoretically achievable rise time of the holographic diffraction efficiency is about 50 μs for purple membrane preparations. The definition of the holographic diffraction efficiency and a description of the correlation between diffraction efficiency and wavelength is given in Kogelnik, H. (1969), Bell Syst. Tech. J. 48, 2909–2947.

The use of suspensions containing purple membranes as recording material is described by V. Y. Bazhenov et al. in *Optical Processing and Computing*, in Chapter 4, *Biopolymers for Real-Time Optical Processing*, 103–144. Although this publication mentions bacteriorhodopsin suspensions having a diffraction efficiency of up to 6%, nothing is stated on the preparation and composition of the suspensions. These suspensions have diffusion-limited rise times of the diffraction efficiency, which results in rise times of the diffraction efficiency of 7 seconds or longer. These rise times of the diffraction efficiency are too slow for use in dynamic holography. Purple membrane suspensions allow resolutions of from 0 to 500 lines/mm to be achieved. The suspensions are therefore unsuitable for use in dynamic holography or for use as high-resolution storage materials, where resolutions up to 5,000 lines/mm are necessary. Neither is it possible to achieve M-type holograms using these suspensions.

This disadvantage is not exhibited by media which contain immobilized purple membranes. In these, the purple membrane, in the form of films or gels embedded in support materials, such as, for example, polymers, is preferably applied to substrates, such as, for example, glass plates or mirrors, or employed in another form which allows a reproducible two-dimensional arrangement.

According to Hampp et al., in *Thin Films in Optics* (Ed.: T. Tschudi), Proc. SPIE 1125, pp. 2–8, films containing purple membrane are obtained by drying purple membrane suspensions on siliconized glass plates. The optical homogeneity of the films can be increased by employing mixtures of water-soluble polymers with purple membrane suspensions. Examples mentioned of water-soluble polymers are polyvinyl alcohol and polyvinylpyrrolidone. A further method mentioned is the embedding in a matrix by direct polymerization in polyacrylamide gels. No details are given on the production of films containing purple membrane. The films have a water content of 60%. The maximum diffraction efficiency is 0.2% for films containing wild-type purple membrane (BR-WT) and 0.3% for films containing a purple membrane variant in which aspartic acid has been replaced by asparagine in position 96 of the bacteriorhodopsin (BR 326 variant).

The article by N. Hampp and C. Bräuchle entitled *Bactedorhodopsin and Its Functional Variants: Potential Applications in Modern Optics,*" published in *Studies in Organic Chemistry* 40, *Photochromism*, pp. 954–957, Ed. H. Dürr, H. Bouas-Laurent, Elsevier, 1990, describes the use of wild-type bacteriorhodopsin and the above-mentioned position-96 variant of bacteriorhodopsin BR 326 in the area of modern optics and holography. The production process disclosed for films containing bacteriorhodopsin involves drying purple membrane suspensions on a glass substrate or embedding it in a polymer. According to this publication, the purple membrane is employed as purchased or prepared for the film production. No details are given on parameters such as salt concentration or buffer solutions or any assistants. The films described therein have a diffraction efficiency of 1% if WT purple membrane is used or 2% if BR-326 variant is used. Biophys. J. 58, 83 (1990), pp. 83–93, discloses various properties of films containing wild-type bacteriorhodopsin or the position-96 variant of bacteriorhodopsin BR 326 for films. The films containing purple membrane were obtained by drying an aqueous purple membrane suspension having a pH of from 6 to 7 on silanized glass plates dried in air overnight. The films have a water content of 60%. According to this publication, the purple membrane is adjusted to a pH of from 6 to 7 for the film production. No details are given on parameters such as salt concentrations or buffer solutions or any assistants. The films obtained have a diffraction efficiency of from 0.2 to 0.4%.

A severe disadvantage which hitherto prevented broader application of purple membrane preparations in holography is the low holographic diffraction efficiency which can be achieved by known purple membrane preparations. This low diffraction efficiency makes it necessary, for example, to use strong lasers to detect the stored holographic information in order to obtain in the detection system a signal which can be clearly registered, i.e., enables a good signal/noise ratio to be obtained. Strong lasers have disadvantages in practice. For example, high laser power is expensive, strong lasers are bulky, and the operation of strong lasers requires relatively high safety standards. In addition, a high laser power results in heating of the sample by the undiffracted light passing through the sample, which may, under certain circumstances, result in destruction of the stored information.

In spite of their relatively high diffraction efficiency, known purple membrane suspensions are, as stated, likewise unsuitable for broad applications due to their slow rise time of diffraction efficiency and their low spatial resolution.

SUMMARY OF THE INVENTION

It is therefore an object of the present invention to provide purple membrane preparations of increased diffraction efficiency which have a faster rise time of the holographic diffraction efficiency than do known purple membrane suspensions.

This object is achieved by providing a purple membrane preparation comprising a composition containing purple membrane, said composition having a diffraction efficiency of greater than 2% and a rise time of holographic diffraction efficiency of less than 5 seconds.

This object is also achieved by providing a purple membrane preparation comprising a composition having a pH between 6 and 11, and containing from 1% to 10% by weight based upon the total composition weight of a proton donor/acceptor, from 1% and 30% by weight based upon the total composition weight of water, and the balance up to 100% by weight based upon the total composition weight of a purple membrane having a photocycle time of at least 10 ms.

The purple membrane preparations according to the invention have a pH of between 6 and 11 and contain a purple membrane having a photocycle time of at least 10 ms and from 1 to 10% by weight of a proton donor-/acceptor and 1–30% by weight of water.

The preferred purple membrane preparations have a diffraction efficiency of 4% or more and a rise time of the diffraction efficiency of less than 1.5 seconds; the particularly preferred purple membrane preparations have a holographic diffraction efficiency of 7% or more and a rise time of the diffraction efficiency of less than 0.6 seconds.

The spatial resolution achieved is greater than 1,500 lines/mm for all the preparations.

Suitable starting materials for the preparation of the purple membrane preparations according to the invention are purple membranes which have a photocycle time of at least 10 ms, measured at 20° C. in a 10 mmol Na/K phosphate buffer solution (pH 7).

Preferably, suitable starting materials for the preparation of the purple membrane preparations according to the invention are purple membranes having a photocycle time of greater than 50 ms, and particularly preferably suitable are purple membranes having a photocycle time of greater than 100 ms.

The photocycle time of purple membrane suspensions can be determined, for example, by flash photolysis experiments. This method is known to persons skilled in the art. In flash photolysis experiments, a short, intense flash of light photochemically excites a component of the purple membrane. A weak detection beam having a wavelength which corresponds to the adsorption maximum of the initial state is suitable for observing the photochemical conversion and the thermal return to the initial state (B-state). The photocycle time is the time taken for the $(1-1/e)$ ($\approx 63\%$) of the excited material to return from the excited state (for example, M-state) to the initial state (for example, B-state) due to thermal relaxation. The maximum possible photocycle time approaches infinity. In this case, the excited state or initial state must be stabilized by exposure to light, and thermal relaxation does not occur.

The isolation of purple membrane (for example from *Halobacterium halobium*, is described, for example, in *Isolation of the Cell Membrane of Halobacterium halobium and Its Fractionation in Red and Purple Membrane* by D. Oesterhelt and W. Stoeckenius, published in *Methods in Enzymology* Vol. 31, Biomembranes, 667–678 (1974), and in EP-A-406 850. Mutants of purple membrane can also be isolated from *Halobactedum halobium* or from other Halobacteria strains by the methods described. In addition, purple membranes which are suitable as starting substances are commercially available, for example, from Wacker-Chemie GmbH.

Examples of preferably suitable starting materials are membranes containing the variant BR 326 or membranes containing bacteriorhodopsin variants in which the population of only one intermediate, such as, for example, the M-state, increases substantially on exposure to light. In preferably suitable membranes of this type, the life of one of the intermediates is significantly longer than the life of all the other intermediates of the photocycle. Furthermore, membranes in which reprotonation of the Schiff base is interfered with during the photocycle are particularly suitable as starting substances for the preparation of the purple membrane preparations according to the invention. These are purple membranes containing a bacteriorhodopsin in which either the amino acid Asp in position 96 is replaced by another natural amino acid, or in which the position of the aspartic acid in position 96 is changed relative to the Schiff base, for example, by deletion or insertion of an amino acid.

The suitable purple membranes are preferably adjusted to an $OD_{570}$ of from 0.2 to 6, particularly preferably to an $OD_{570}$ of greater than 4 to 6, and to a pH of between 6 and 11, preferably between 6.5 and 9, by means of a buffer. An example of a buffer which can be used is 10 mM Na/K phosphate.

The amount of a proton donor/acceptor which is added can be from 1% to 10% by weight, based on the dry weight of purple membrane. The proton donor/acceptor comprises, for example, one or more substances selected from the group consisting of glycerol, guanidine, arginine, urea, diethylamine, sodium azide, glycols, monosaccharides, disaccharides, polysaccharides, and monofunctional or polyfunctional alcohols. Preferred proton donors/acceptors are glycerol, arginine and/or diethylamine. Particular preference is given to glycerol. The water is removed from this suspension down to a residual content of from 1% to 30% by weight, preferably from 5% to 20% by weight based upon the total composition weight. The water can be removed, for example, by drying or by centrifugation.

The balance of the preparation up to 100% by weight is the purple membrane which is the balance in weight percent based upon the total composition weight.

The purple membrane preparation obtained in this way surprisingly has a holographic diffraction efficiency of greater than 2% and a rise time of the diffraction efficiency of less than 5 seconds, and a spatial resolution of greater than 1,500 lines/mm.

Depending on the desired application of the purple membrane preparations according to the invention, the preparation process can be modified so that the purple membrane preparation is processed before, during or after the preparation according to the invention, in each case corresponding to the desired application, as known from the respective prior art. The increased diffraction efficiency of greater than 2% and the rise time of the diffraction efficiency of less than 5 seconds and the values for the preferred or particularly preferred embodiments and the resultant improved application properties are also exhibited by the correspondingly processed purple membrane preparations.

The purple membrane preparations according to the invention can be employed for all applications known from the prior art. Examples of particularly suitable applications are the production of purple membrane-containing films, the use for transient holographic storage, holographic interferometry, holographic pattern recognition, optical phase conjugation, optical neuronal networks, holographic associative memories and nonlinear optical filtering.

If the purple membrane preparation is used, for example, for the production of purple membrane-containing films, it is applied to the surface of a substrate of controlled optical quality under the action of gravity and sealed by means of a second substrate. For the production of films containing immobilized purple membrane, the spin-coating technique is also suitable.

It has been found that films produced in this way have a diffraction efficiency of greater than 2% and a rise time of the diffraction efficiency of less than 5 seconds. If the preferred purple membrane preparations are used, the values mentioned above for these preparations are achieved.

The diffraction efficiency of the purple membrane preparations according to the invention increases with increasing pH. The diffraction efficiency of the purple membrane preparation increases with increasing photocycle time of the purple membrane used as a starting substance.

Thus, for example, the use of the purple membrane variant BR 326 for the preparation of the purple membrane preparation according to the invention causes significantly increased diffraction efficiencies to be achieved even at lower, protein-protecting pH values.

DETAILED DESCRIPTION OF THE PREFERRED EMBODIMENTS

Other objects and features of the present invention will become apparent from the following detailed description considered in connection with the accompanying examples which disclose several embodiments of the present invention. It should be understood, however, that the examples are designed for the purpose of illustration only and not as a definition of the limits of the invention.

EXAMPLE 1

0.6 ml of a commercial purple membrane suspension (manufacturer Wacker-Chemie GmbH, Munich, Germany) of type BR 326, having an optical density of 30 at 570 nm and a photocycle time of 2,400 ms at 20° C. and pH 7 in 10 mmol/l Na/K phosphate buffer is adjusted to a pH of 8.0 using 9.4 ml of a pH 8 Na/K phosphate buffer (100 mmol/l ) containing 20 mmol/l of sodium chloride and 6% (vol./vol.) of glycerol (87%). The pH is monitored by means of a glass electrode. $OD_{570}$ of the suspension is 5.2. The suspension is subsequently introduced into a centrifugation holder containing, at the base, a flat-ground glass disk having a diameter of 22.4 mm on a Teflon insert matched to the centrifuge insert, and a cylinder having an internal hole of 16.2 mm. The mixture is centrifuged at 23,000 rpm for 45 minutes in an ultracentrifuge in a TST 28.2 rotor. The clear supernatant is subsequently poured off, and the round glass disk, which now carries a purple membrane film having the diameter of the cylinder hole in the center, is removed from the centrifuge invert. After drying for 24 hours at 20° C. at 30% relative atmospheric humidity, two of these films are placed against one another and pressed onto one another. A stainless steel ring having a thickness of 25 $\mu$m is used as spacer. During the pressing operation, the film is heated at 60° C. for 10 minutes and then cooled over the course of one hour. The resultant film has a water content of 5% by weight (weight loss during drying at 20° C. over calcium chloride).

At a writing intensity of 20 mW/cm$^2$ and a writing wavelength of 568 nm and an angle of 45° between the writing beams, and a reading wavelength of 632.8 nm, the film has a hologram efficiency of 7%. The rise time of the holographic diffraction efficiency was 500 ms. The holographic resolution was significantly greater than 2,500 lines/mm.

EXAMPLE 2

0.6 ml of a commercial purple membrane suspension (manufacturer Wacker-Chemie GmbH, Munich, Germany) of the BR 326 type, having an optical density of 30 at 570 nm and a photocycle time of 2,500 ms at 20° C. and pH 7 in 10 mmol/l Na/K phosphate buffer is mixed with 9.4 ml of a pH 6.5 Na/K phosphate buffer (100 mmol/l) containing 20 mmol/l of sodium chloride and 6% (vol./vol.) of glycerol (87%). The pH is monitored by means of a glass electrode, and is 6.5. The OD$_{570}$ of the suspension is 5.0.

A film is produced as described in Example 1 from the purple membrane suspension.

The resultant film has a water content of 5% by weight. It has a maximum achievable holographic diffraction efficiency of 4% at a writing intensity of 50 mW/cm$^2$ and a writing wavelength of 568 nm and an angle of 45° between the writing beams, and a reading wavelength of 632.8 nm. The rise time of the holographic diffraction efficiency was 300 ms. The holographic resolution was significantly greater than 2,500 lines/mm.

EXAMPLE 3

A film containing immobilized purple membrane is produced as described in Example 1. The purple membrane suspension of type BR 326 was replaced by a wild-type purple membrane suspension. This had a photocycle time of 10 ms, measured as described in Example 1. The OD$_{570}$ of the suspension employed to produce the film is 5.2. The resultant film has a water content of 5% by weight. It has a maximum achievable holographic diffraction efficiency of 2.2% at a writing intensity of 100 mW/cm$^2$ and a writing wavelength of 568 nm and an angle of 45° between the writing beams, and a reading wavelength of 632.8 nm. The rise time of the holographic diffraction efficiency was 100 ms. The holographic resolution was significantly greater than 2,500 lines/mm.

COMPARATIVE EXAMPLE 1

The commercially available purple membrane suspension of type BR 326 is converted to a film as described in the prior art, i.e., the pH is adjusted to 6.5 by means of an Na/K phosphate buffer, no glycerol is added, and the film is dried to a water content of 60%. The resultant film has a maximum achievable holographic diffraction efficiency of 2% at a writing intensity of 20 mW/cm$^2$ and a writing wavelength of 568nm and an angle of 45° between the writing beams, and a reading wavelength of 632.8 nm. The rise time of the holographic diffraction efficiency is 150 ms.

COMPARATIVE EXAMPLE 2

The procedure is analogous to that described in Comparative Example 1. The purple membrane suspension employed is a wild-type purple membrane. The photocycle time is 10 ms. The resultant film has a maximum achievable holographic diffraction efficiency of 1% at a writing intensity of 20 mW/cm$^2$ and a writing wavelength of 568 nm and an angle of 45° between the writing beams, and a reading wavelength of 632.8 nm. The rise time of the holographic diffraction efficiency is 120 ms.

While several embodiments of the present invention have been shown and described, it is to be understood that many changes and modifications may be made thereunto without departing from the spirit and scope of the invention as defined in the appended claims.

What is claimed is:

1. A purple membrane preparation comprising:
    a composition containing a purple membrane;
    wherein said purple membrane contains a bacteriorhodopsin variant in which the amino acid aspartic acid in position 96 has been replaced by any other natural amino acid, or in which the position of the aspartic acid in position 96 relative to the Schiff base has been changed;
    said composition having a diffraction efficiency of greater than 2% and a rise time of holographic diffraction efficiency of less than 5 seconds;
    said composition having a pH between 6 and 11, and containing
    from 1% to 10% by weight based upon the total composition weight of glycerol as a proton donor/acceptor;
    from 1% to 30% by weight based upon the total composition weight of water; and
    the balance up to 100% by weight based upon the total composition weight being said purple membrane having a photocycle time of at least 10 ms.

2. A purple membrane preparation as claimed in claim 1,
    wherein said purple membrane contains the bacteriorhodopsin variant BR 326.

3. A purple membrane preparation as claimed in claim 1,
    wherein said purple membrane has a photocycle time of greater than 50 ms.

4. A purple membrane preparation as claimed in claim 1,
    wherein said purple membrane has a photocycle time of greater than 100 ms.

5. A process for producing a purple membrane preparation comprising:
    providing a purple membrane suspension in water containing a bacteriorhodopsin variant in which the amino acid aspartic acid in position 96 has been replaced by any other natural amino acid, or in which the position of the aspartic acid in position 96 relative to the Schiff base has been changed;
    adjusting the pH of said purple membrane suspension to a pH of between 6 and 11;
    adding from 1% to 10% by weight based upon the total preparation weight of glycerol as a proton donor/acceptor to said purple membrane suspension; and
    removing water from the resultant suspension down to a residual water content of from 1% to 30% by weight based upon the total preparation weight.

* * * * *